UNITED STATES PATENT OFFICE.

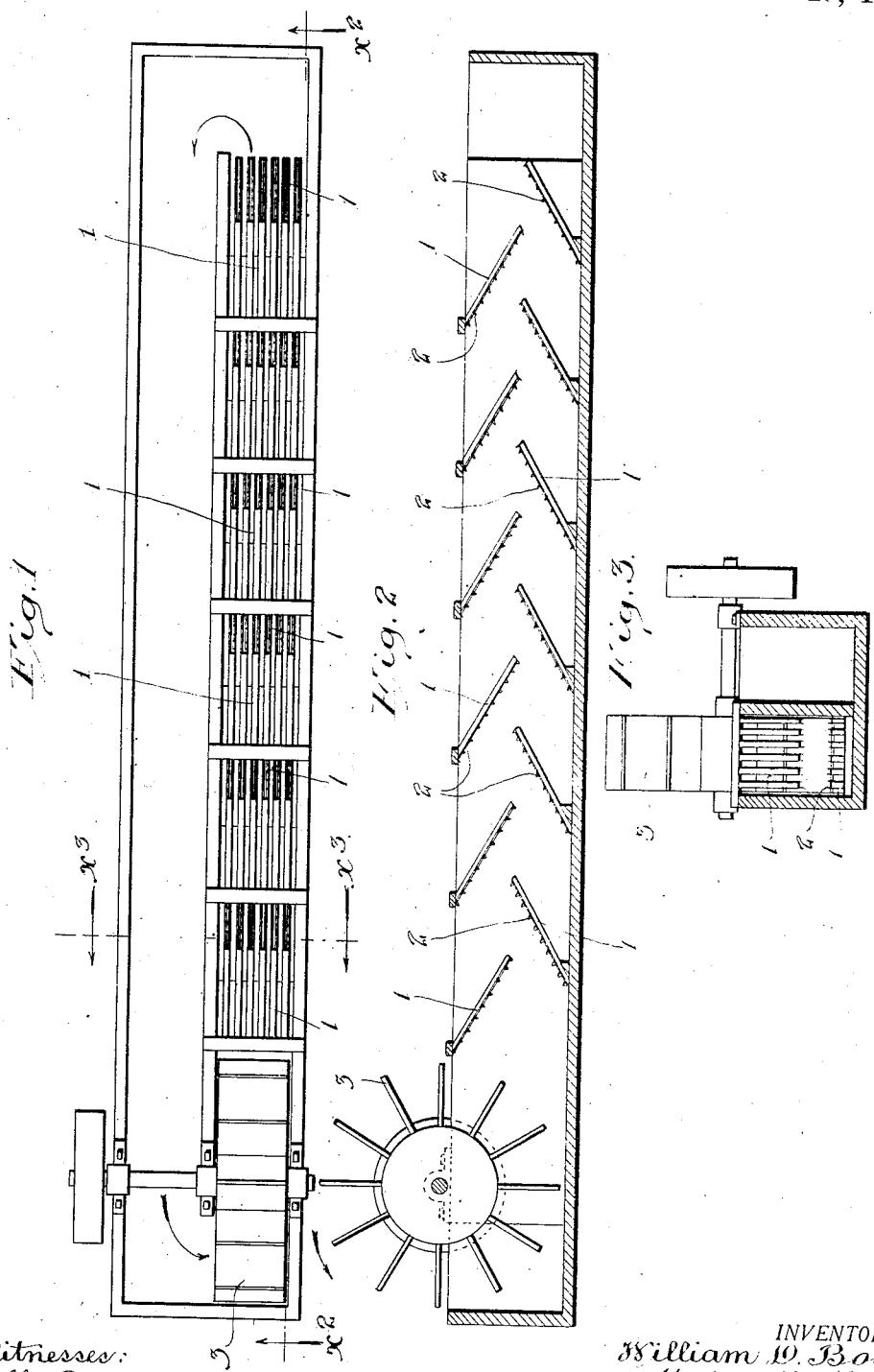

WILLIAM DALE BOST AND HARRY M. MILLER, OF LOS ANGELES, CALIFORNIA; SAID BOST ASSIGNOR TO SAID MILLER.

PROCESS OF PEELING FRUITS AND VEGETABLES.

1,394,138. Specification of Letters Patent. Patented Oct. 18, 1921.

Application filed November 16, 1918. Serial No. 262,886.

*To all whom it may concern:*

Be it known that we, WILLIAM DALE BOST and HARRY M. MILLER, both citizens of the United States, residing at Los Angeles, in the county of Los Angeles and State of California, have invented a new and useful Process of Peeling Fruits and Vegetables, of which the following is a specification.

This invention relates to the peeling of fruits and vegetables by subjecting the fruits or vegetables to the action of certain chemicals to loosen the peel from the body and to then restore the original flavor, appearance and physical characteristics of the body.

An object of the invention is to provide for economic peeling of fruits, tomatoes and other vegetables.

Another object is to provide a process whereby the peelings or skins of the fruits and vegetables are removed without any deleterious effect on the body thereof so that the body will be fully as good in flavor and appearance as though hand peeling were employed.

Another object is to provide a process whereby fruits may be relieved of their peelings or skins without discoloration of the pit cavity thereof.

Other objects and advantages will appear in the subjoined detailed description.

The accompanying drawings illustrate an apparatus for performing some of the operations of the process.

Figure 1 is a plan view of a perforating apparatus for producing perforations in the fruit skins.

Fig. 2 is a longitudinal sectional elevation on line indicated by $x^2$—$x^2$ Fig. 1.

Fig. 3 is a transverse sectional elevation on line indicated by $x^3$—$x^3$ Fig. 1.

Hereinafter, to make this specification concise, the term "fruit" will be employed to signify not only fruits but vegetables also, it being understood that the term "fruit" defines any fruit or vegetable having a skin or peel that can be removed by the various steps of the process now to be disclosed.

The fruit preferably will be first washed and assorted or graded and then the fruit will be treated by an operation that is well known in the art pertaining to the peeling of fruits such as peaches. This operation consists in subjecting the fruit to the action of an alkali. The alkali may be in any suitable form and we at present employ it as an alkaline fluid in the form of a liquid or solution which may vary in strength, for example, from one one-hundredth of one per cent. alkali to a saturated solution. The temperature of the fluid employed may vary, for example, from aproximately —10° C. to 150° C. The duration of time in which the fruit is subjected to the action of the alkali is, for example, from one second to 48 hours. It will be understood that the strength of the alkaline fluid employed varies inversely with the temperature and time, that is to say, the stronger the fluid is, the lower the temperature and the shorter the time required in the skin-loosening operation. The strength and temperature of the fluid and the duration of the alkaline treatment will also vary to some extent according to the kind of fruit being treated, some kinds of fruit requiring greater strength or higher temperature or longer time for treatment than other kinds.

The alkaline fluid when in the form of a solution will be contained in a suitable tank and the fruit may be conveyed or carried into the solution in the tank by any suitable means. The fruit will also be conveyed through the solution in the tank by positive means such as a conveyer or by suitable currents set up in the solution by mechanical means or by jets of steam or the like so that all portions of the fruit will be thoroughly treated with the alkali. When steam is employed for agitating the solution, it is clear that the steam will heat or aid in heating the solution to the required temperature.

In its broader aspects the invention includes the treatment of the fruit with any alkali or with a fluid containing an alkali producing substance. The various oxids and hydroxids, for example, may be used for the alkali treatment. Sodium hydroxid may be used and other examples of alkalis that may be employed for the treatment are calcium oxid and calcium hydroxid. Sodium hydroxid, at the present time, we consider to be a good form of alkali to use since it is less expensive than many others.

The next operation may not always be necessary and is therefore not an absolutely essential step in the process but it is preferable to employ it in the treatment of tough skinned fruit such, for instance, as tomatoes, the operation referred to being mechanically rupturing the skins by a skin-perforating or puncturing operation. This mechanical rupturing of the skins may be effected by causing the fruit to pass over or under or in contact with pricking members 1 having sharp points 2 adapted to penetrate the skins of the fruit and the perforating may be effected by any mechanical means that will rupture the skins. This perforation of the skins may be accomplished as a separate step or in conjunction with the next operation in which the fruit is washed to remove as much of the alkali as will readily wash off. To accomplish this the fruit is carried or conveyed into a tank of water. The peels or skins are removed in the body of water and this is done by agitation of the water. The water may be agitated by paddle wheel 3 or any other suitable means and we at present prefer to employ compressed air, said air being discharged into the water in such manner as to violently agitate the water as is well understood by those versed in the art pertaining to the agitation of liquids. The skins previously loosened by the alkali treatment readily slip off of the fruit bodies because of the friction of the moving particles of water, and a large proportion of the alkali is also washed from the bodies. The perforating of the skins insures that the skins will readily become detached from the pulp bodies.

After the fruit has been treated with the alkali and has been washed and the skins removed as above described the denuded fruit bodies still have more or less alkali on them which unless prevented will penetrate and soften or "mush" the outermost portions, at least of the fruit. In the case of tomatoes, peaches, pears, and the like the flavor is injured if the alkali remain since the alkali appears to neutralize the acid to some extent, thus causing the fruit to have a "flat" taste. The alkali treatment also leaves the fruit more or less "slimy" or "slick." Also, unless arrested, the alkali causes discoloration of the pit cavities.

In order to prevent this objectionable softening of the fruit, discoloration of the fruit pit cavities and destruction of the original full flavor of the fruit, we employ another treatment which may be termed a neutralizing operation. To overcome the objections noted above the fruit bodies after the peels have been removed are subjected to the action of an acid solution which may vary in strength from one one-hundredth of one per cent. of acid to substantially a saturated solution. The acid solution is placed in a tank and the fruit bodies are conveyed or carried from the tank of water in which the fruit was washed and skins were shed to the tank containing the acid solution and said bodies are conveyed or otherwise moved through the acid solution.

Any suitable acid may be used in making the acid solution, for instance, hydrochloric acid may be used. Another example of an acid that can be used for the neutralizing bath is acetic acid.

This treatment with an acid solution neutralizes whatever alkali has remained on the fruit bodies after the previous washing with water, the acid and alkali together forming a salt. We have discovered that the acid treatment restores the original full flavor of the fruit, and this is probably due to the acid breaking down the salts formed by the fruit acids combining with the alkali used for softening and loosening the peel from the fruit body. After the neutralizing treatment the fruit is again subjected to a washing operation to wash off the salt and whatever free acid there may be. The fruit is now ready for canning or dehydrating.

From the foregoing it is clear that the peeling of fruits and vegetables by the process is effected in a minimum of time with comparatively little labor. The process has been successfully employed in peeling tomatoes and sweet potatoes as well as other fruits. It is understood that the process in its broader phases is not limited to the employment of the temperatures, periods of time of the alkali and acid treating operations and strengths of the alkali and acid solutions given above, and that the invention includes such changes and modifications in the process as lie within the spirit and scope of the appended claims.

We claim:

1. The process of peeling tomatoes, which consists in treating the tomatoes with an alkali to loosen the skins from the pulp bodies, puncturing the tomatoes to produce openings in the skins after they have been thus loosened, and then causing water to enter the openings to force the skins outwardly from the bodies.

2. The process of peeling tomatoes, which consists in treating the tomatoes with an alkali to loosen the skins from the pulp bodies, puncturing the tomatoes to produce openings in the skins after they have been thus loosened, then causing water to enter the openings to force the skins outwardly from the bodies, washing the bodies after the skins are forced therefrom, subjecting the bodies thus treated to an acid solution, and then washing the bodies thus treated.

3. The process of peeling fruit, which consists in treating the fruit with an alkali to loosen the skins from the bodies, perforating the skins, discharging the fruit thus treated into a body of water, and agitating the water to cause the skins to separate from the fruit bodies.

4. The process of peeling fruit, which consists in treating the fruit with an alkali to loosen the skins from the bodies, perforating the skins, discharging the fruit thus treated into a body of water, and causing a compressed fluid to discharge into the body of water to cause the skins to separate from the bodies.

5. The process of peeling fruit, which consists in treating the fruit with an alkali to loosen the skins from the bodies, perforating the skins, separating the skins from the bodies and washing the bodies, subjecting the bodies thus treated to an acid solution, and then washing the bodies thus treated.

6. The process of peeling fruit, which consists in treating the fruit with an alkali to loosen the skins from the bodies, perforating the skins, discharging the fruit thus treated into an agitated body of water, subjecting the bodies thus treated to the action of an acid solution, and then washing the bodies thus treated.

7. The process of peeling fruit, which consists in treating the fruit with an alkali to loosen the skins from the bodies, producing openings in the skins, separating the skins from the bodies and washing the bodies, subjecting the bodies thus treated to an acid solution, and then washing the bodies thus treated.

Signed at Los Angeles, California, this 5th day of November, 1918.

WILLIAM DALE BOST.
HARRY M. MILLER.

Witnesses:
GEORGE H. HILES,
L. BELLE WEAVER.